United States Patent
Gao

(10) Patent No.: US 9,356,641 B2
(45) Date of Patent: May 31, 2016

(54) PROTECTIVE CASE AND ELECTRONIC DEVICE USING SAME

(71) Applicants: SHENZHEN FUTAIHONG PRECISION INDUSTRY CO., LTD., Shenzhen (CN); FIH (Hong Kong) Limited, Kowloon (HK)

(72) Inventor: Yan-Ling Gao, Shenzhen (CN)

(73) Assignees: SHENZHEN FUTAIHONG PRECISION INDUSTRY CO., LTD., Shenzhen (CN); FIH (Hong Kong) Limited, Kowloon (HK)

( * ) Notice: Subject to any disclaimer, the term of this patent is extended or adjusted under 35 U.S.C. 154(b) by 312 days.

(21) Appl. No.: 14/040,881

(22) Filed: Sep. 30, 2013

(65) Prior Publication Data

US 2014/0346064 A1  Nov. 27, 2014

(30) Foreign Application Priority Data

May 24, 2013  (CN) .................. 2013 2 02896289

(51) Int. Cl.
| | |
|---|---|
| A45C 15/00 | (2006.01) |
| B65D 85/00 | (2006.01) |
| H04B 1/3888 | (2015.01) |
| A45C 11/00 | (2006.01) |

(52) U.S. Cl.
CPC .............. *H04B 1/3888* (2013.01); *A45C 11/00* (2013.01); *A45C 2011/002* (2013.01)

(58) Field of Classification Search
CPC ...... A45C 11/00; A45C 11/22; A45C 13/008; A45C 2011/002; H04B 1/3888
USPC ......... 206/37, 38, 234, 320, 388; 361/679.01, 361/679.55, 679.56; 455/575.1, 575.8
See application file for complete search history.

(56) References Cited

U.S. PATENT DOCUMENTS

| | | | | |
|---|---|---|---|---|
| 5,887,720 | A * | 3/1999 | Lin .......................... | H04R 1/10 206/38 |
| 6,237,767 | B1 * | 5/2001 | Lee ........................ | B25H 3/023 206/234 |
| 6,401,932 | B1 * | 6/2002 | Weinstein .............. | B65D 25/24 206/320 |
| 8,517,172 | B1 * | 8/2013 | Chang ................... | G06F 1/1626 206/320 |
| 8,631,934 | B2 * | 1/2014 | Chun ....................... | A47G 1/24 206/320 |
| 8,842,872 | B2 * | 9/2014 | Stevinson ............ | H04R 1/1033 381/384 |
| 2007/0154048 | A1 * | 7/2007 | Chang ..................... | H04M 1/05 381/371 |
| 2007/0256946 | A1 * | 11/2007 | Godshaw ............... | B65D 25/10 206/320 |
| 2013/0069499 | A1 * | 3/2013 | Modrell ............... | G06F 1/1656 312/223.1 |

* cited by examiner

*Primary Examiner* — Luan K Bui
(74) *Attorney, Agent, or Firm* — Novak Druce Connolly Bove + Quigg LLP

(57) ABSTRACT

A protective case includes a main housing and a cover. The main housing includes a wire arranging portion with a first frame, a second frame, and a third frame. The first frame and the second frame are diagonally positioned each other, and the third frame are positioned at one side of the second frame. The cover is detachable from the main housing for covering the wire arranging portion.

11 Claims, 3 Drawing Sheets

PROTECTIVE CASE AND ELECTRONIC DEVICE USING SAME

BACKGROUND

1. Technical Field

The exemplary disclosure relates to protective cases, and particularly to a protective case for an electronic device.

2. Description of Related Art

Portable electronic devices can have a protective case to protect the electronic device. The portable electronic devices also need to use a data wire to charge a battery or transmit data. Since most electronic devices are not configured with an integrated data wire, the data wire needs to be separately carried. Thus, the data wire may easily be lost.

Therefore, there is room for improvement within the art.

BRIEF DESCRIPTION OF THE DRAWINGS

Many aspects of the exemplary protective case and electronic device using the protective case can be better understood with reference to the following drawings. These drawings are not necessarily drawn to scale, the emphasis instead being placed upon clearly illustrating the principles of the present protective case and electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
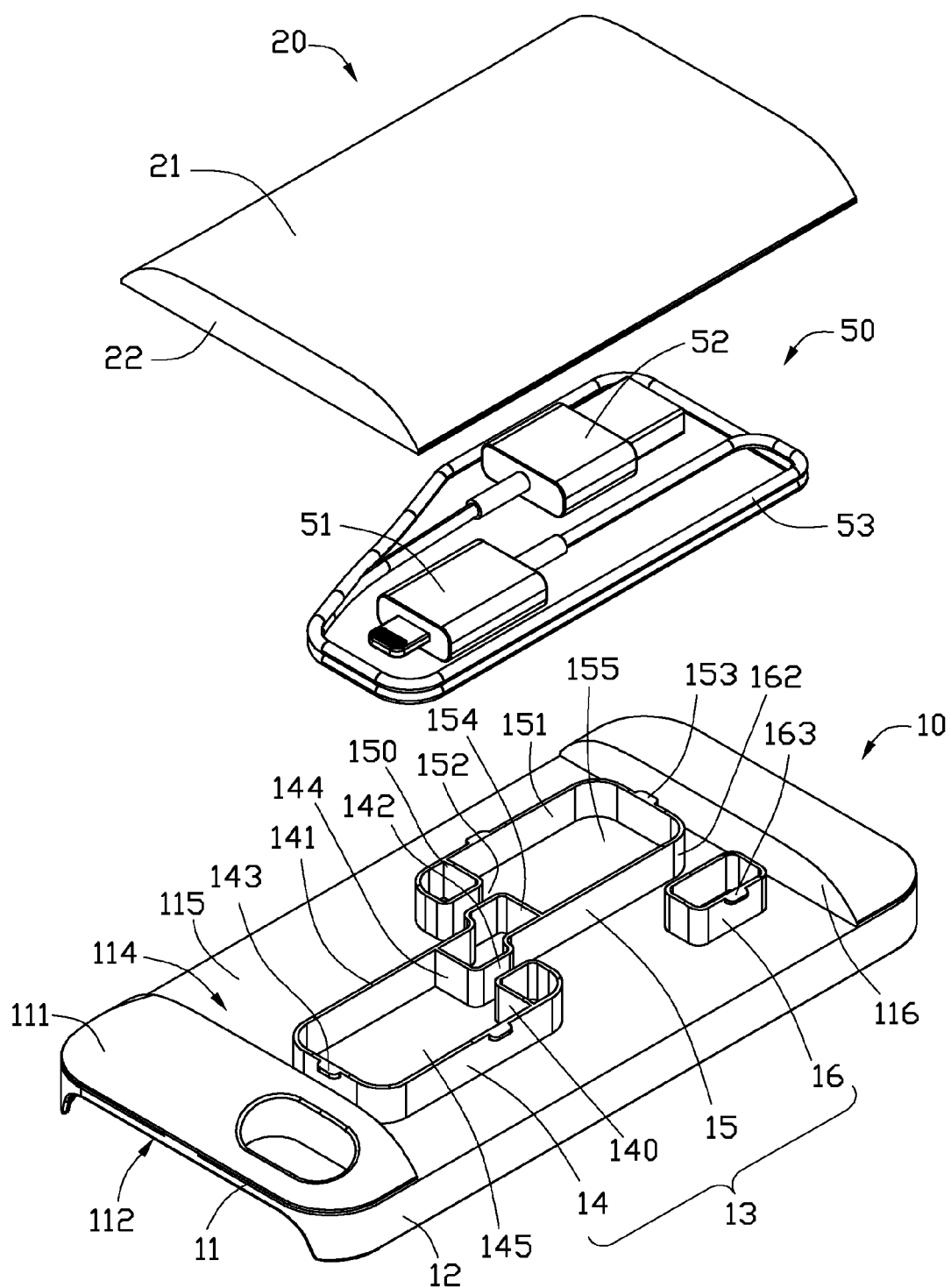
FIG. 1 is an exploded view of a protective case for an electronic device with a data wire according to an exemplary embodiment.
Figure 2:
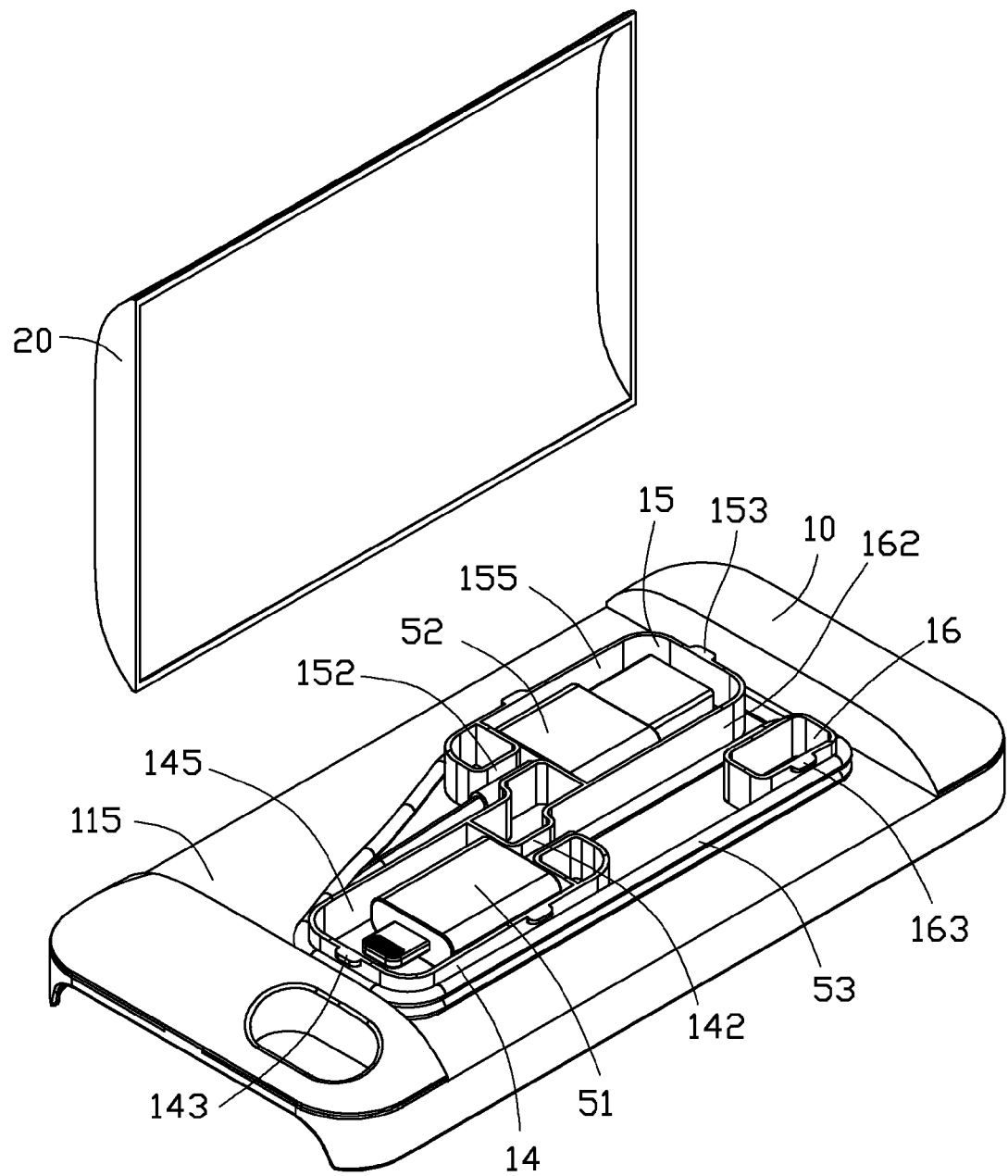
FIG. 2 is a partial assembled view of the protective case of FIG. 1.
Figure 3:
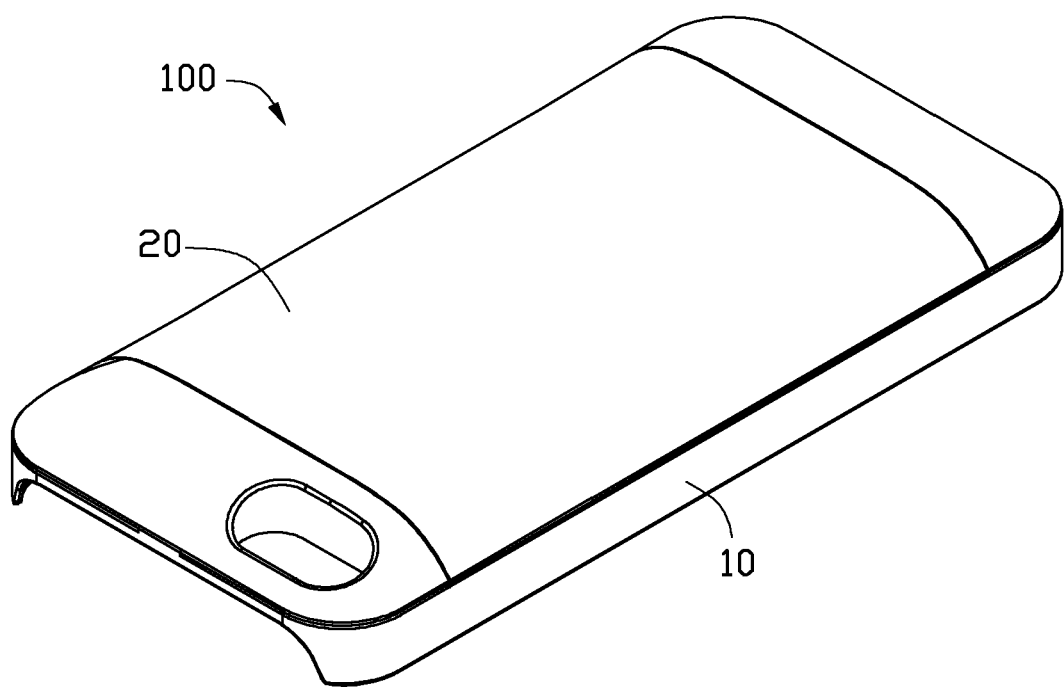
FIG. 3 is an assembled view of the protective case of FIG. 1.

FIGS. 1 to 3 illustrate a protective case 100 used for holding an electronic device, such as a mobile phone and a data wire 50, such as a USB cable. The mobile phone is merely an exemplary application for the purpose of describing details of the protective case 100. The protective case 100 includes a main housing 10 and a cover 20 detachable from the main housing 10. The data wire 50 includes a first port 51, a second port 52 and a connecting wire 53 between the first port 51 and the second port 52.

The main housing 10 is configured for receiving the portable electronic device. In this exemplary embodiment, the main housing 10 is substantially rectangular, and includes a base plate 11 and a peripheral wall 12 extending from all sides of the base plate 11. The peripheral wall 12 holds the portable electronic device in the main housing 10.

The base plate 11 has a first surface 111 (e.g. a back surface) and a second surface 112 (e.g. a front surface) opposite to each other. The first surface 111 defines a receiving cavity 114 for latching with the cover 20. The receiving cavity 114 is surrounded by a bottom wall 115 and two opposite sidewalls 116. The cover 20 includes a plate portion 21 and two side plates 22. The plate portion 21 is substantially arcuate, and covers the receiving cavity 114 opposite to the bottom wall 115. The two side plates 22 latch with the sidewalls 116 of the receiving cavity 114.

The receiving cavity 114 has a wire arranging portion 13 for arranging the data wire 50 of the portable electronic device. In this exemplary embodiment, the wire arranging portion 13 has a first frame 14, a second frame 15, and a third frame 16. The first frame 14 and the second frame 15 are diagonally positioned on the bottom wall 115. The first frame 14 has a peripheral wall 141, a first coiled portion 140 and a second coiled portion 144. The first coiled portion 140 and the second coiled portion 144 are positioned at one end of the first frame 14, and are spaced from each other. A first clearance 142 is defined between the first coiled portion 140 and the second coiled portion 144. The first frame 14 defines a first groove 145 for receiving the first port 51. The second frame 15 has a similar structure with the first frame 14, and includes a peripheral wall 151, a first coiled portion 150 and a second coiled portion 154. The first coiled portion 150 and the second coiled portion 154 are positioned at one end of the second frame 15, and are spaced from each other. A second clearance 152 is defined between the first coiled portion 150 and the second coiled portion 154. The second coiled portion 144 and the second coiled portion 154 are diagonally positioned each other, and communicate with each other. The second frame 15 defines a second groove 155 for receiving the second port 52. The size of the third frame 16 is smaller than the first frame 14 and the second frame 15, and is positioned at one side of the second frame 15. One end of the third frame 16 is flushed with one end of the second frame 15. A third clearance 162 is defined between the second frame 15 and the third frame 16. The first frame 14, the second frame 15, and the third frame 16 respectively have tabs 143, 153, 161 for preventing the data wire 50 from separating.

FIGS. 2 and 3 show that in assembly, the second port 52 is first received in the second groove 155, and the portion of the connecting wire 53 connected to the second port 52 is latched in the second clearance 152. Then, the connecting wire 53 is orderly coiled around the first frame 14, the third frame 16, and the second frame 15, and is further coiled around the first frame 14 and the third frame 16. Next, the connecting wire 53 coiled around the third frame 16 extends through the third clearance 162, is latched in the first clearance 142 the first port 51 until the first port 51 is received in the first groove 145. Thus, the data wire 50 is arranged on the wire arranging portion 13. Finally, the cover 20 covers the receiving cavity 114 for hiding the data wire 50 and the wire arranging portion 13.

The present embodiment of the protective case 100 conveniently carries the data wire of the electronic device.

Even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A protective case comprising:
a main housing including a wire arranging portion, the wire arranging portion including a first frame, a second frame, and a third frame, the first frame and the second frame diagonally positioned each other, and the third frame positioned at one side of the second frame; and
a cover detachably attached to the main housing for covering the wire arranging portion;
wherein the first frame has a peripheral wall, a first coiled portion, and a second coiled portion, the first coiled portion and the second coiled portion are positioned at one end of the first frame, and are spaced from each other, a first clearance is defined between the first coiled portion and the second coiled portion of the first frame.

2. The protective case of claim 1, wherein the main housing includes a base plate and a peripheral wall extending from all sides of the base plate, the peripheral wall is configured for holding a portable electronic device in the main housing.

3. The protective case of claim 2, wherein the base plate has a first surface and a second surface opposite to each other, the first surface defines a receiving cavity, and the wire arranging portion is formed in the receiving cavity.

4. The protective case of claim 1, wherein the second frame includes a peripheral wall, a first coiled portion and a second coiled portion, the first coiled portion and the second coiled portion are positioned at one end of the second frame, a second clearance is defined between the first coiled portion and the second coiled portion, the second coiled portion of the first frame and the second coiled portion of the second frame are diagonally positioned each other, and communicate with each other.

5. The protective case of claim 4, wherein the size of the third frame is smaller than the first frame and the second frame, and is positioned at one side of the second frame, one end of the third frame is flushed with one end of the second frame, a third clearance is defined between the second frame and the third frame.

6. The protective case of claim 3, wherein the receiving cavity is surrounded by a bottom wall and two opposite sidewalls, the cover includes a plate portion and two side plates, the plate portion covers the receiving cavity opposite to the bottom wall, and the two side plates latch with the sidewalls of the receiving cavity.

7. The protective case of claim 3, wherein the first frame, the second frame, and the third frame respectively have tabs configured for preventing a data wire from separating therefrom.

8. A protective case comprising:
a main housing including a wire arranging portion, the wire arranging portion including a first frame, a second frame, and a third frame, the first frame and the second frame diagonally positioned each other, and the third frame positioned at one side of the second frame;
a data wire including a first port, a second port, and a connecting wire between the first port and the second port; and
a cover detachably attached to the main housing for covering the wire arranging portion,
wherein the first port is received in the first frame, the second port is received in the second frame, the connecting wire is coiled around the first frame, the second frame and the third frame.

9. The electronic device of claim 8, wherein the first frame has a peripheral wall, a first coiled portion and a second coiled portion, the first coiled portion and the second coiled portion are positioned at one end of the first frame, and are spaced from each other, a first clearance is defined between the first coiled portion and the second coiled portion of the first frame.

10. The protective case of claim 9, wherein the second frame includes a peripheral wall, a first coiled portion and a second coiled portion, the first coiled portion and the second coiled portion are positioned at one end of the second frame, a second clearance is defined between the first coiled portion and the second coiled portion, the second coiled portion of the first frame and the second coiled portion of the second frame are diagonally positioned each other, and communicate with each other.

11. The protective case of claim 10, wherein the size of the third frame is smaller than the first frame and the second frame, and is positioned at one side of the second frame, one end of the third frame is flushed with one end of the second frame, a third clearance is defined between the second frame and the third frame.

* * * * *